UNITED STATES PATENT OFFICE.

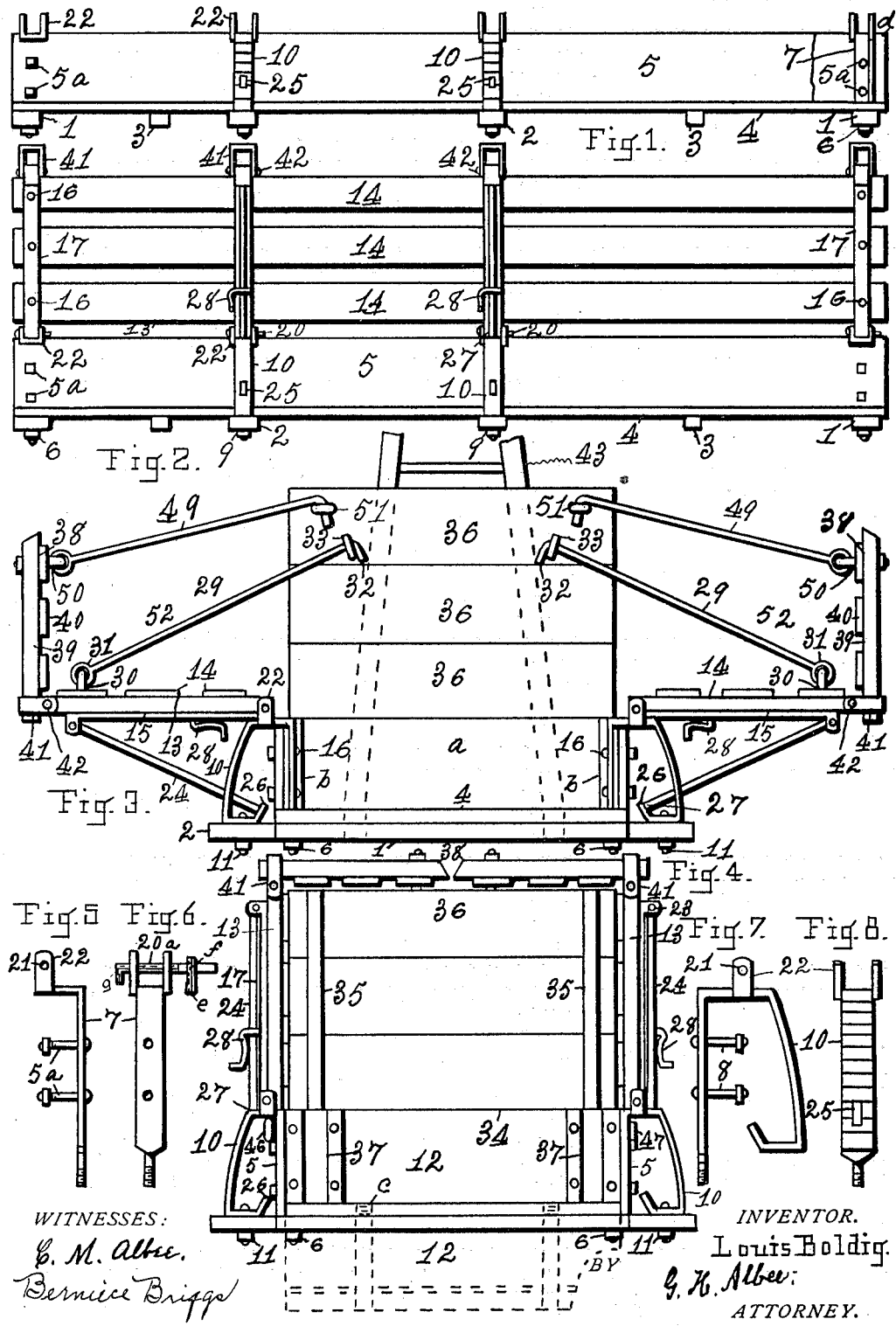

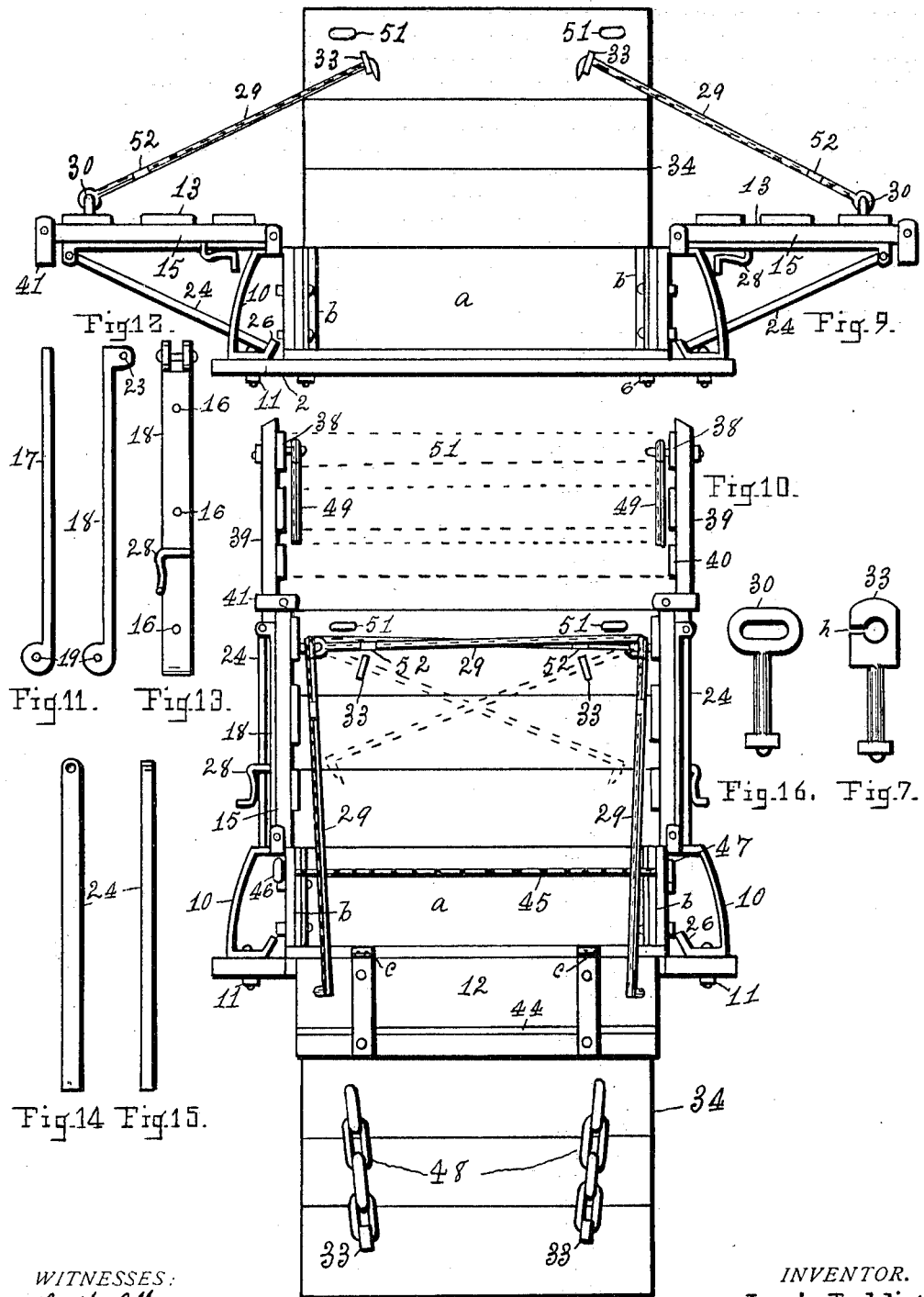

LOUIS BOLDIG, OF TIGERTON, WISCONSIN.

COMBINED HAY, STOCK, AND FOWL RACK.

1,048,799.  Specification of Letters Patent.  Patented Dec. 31, 1912.

Application filed August 7, 1911. Serial No. 642,789.

*To all whom it may concern:*

Be it known that I, LOUIS BOLDIG, a citizen of the United States, residing at Tigerton, in the county of Shawano and State of Wisconsin, have invented a new and useful Combined Hay, Stock, and Fowl Rack, of which the following is a specification.

My invention relates to an improved construction of racks adapted for application to an ordinary farm wagon box for forming a hay or grain rack, it having side wings placed vertically above the usual side boards and correspondingly high end boards for carrying small live stock such as sheep, calves, &c., two tiers high of side wings, the upper of which I term "basket sides," with suitable end boards for carrying large live stock, and said basket sides fitted to the side wings at right angles therewith, and with the side wings horizontally arranged, forming a fine hay, grain bundle rack, &c., and with said wings vertically arranged forming a fowl carrying rack, and thus making with the usual wagon box, six different shaped receptacles for carrying the various products of the farm, and the object of the improvement is, to provide the various styles of racks required in farming, stock and fowl raising, which can be applied to a single wagon box of the usual type.

My improvements are shown in the accompanying drawing, in which,—

Figure 1 is a side elevation of an ordinary wagon box, fitted for receiving the racks for its several purposes. Fig. 2 is a side elevation of an ordinary wagon box, as in Fig. 1, with its side wings in a vertical position thereon, for carrying corn, root crops and small live stock. Fig. 3 is a rear end view of the wagon box with a side wing hinged to it upon opposite sides and lying nearly horizontal, with the basket sides arranged vertically, from their outer edges, and suiting the rack for carrying bundles of grain, fine hay, &c. Fig. 4 is an end elevation of the wagon box with its side wings vertically arranged thereon, and the basket sides of Fig. 3, nearly meeting and serving as a cover to the rack for a live fowl carrying rack. Fig. 5 is an edge elevation of one portion of a hinge which is used at each end of the wagon box. Fig. 6 is a side elevation of said hinge. Fig. 7 is an edge elevation of one portion of a hinge which is used intermediate the ends of the wagon box. Fig. 8 is a side elevation of said hinge. Fig. 9 is an end elevation of a wagon box, with side wings horizontally arranged, as is suited for carrying hay. Fig. 10 is an end elevation, with side wings and basket sides arranged vertically, as is best suited for carrying large live stock, and its rear end board hinged at its lower edge and fallen vertically downward from the rear end of the wagon. Fig. 11 is an edge elevation of a companion hinge member to Figs. 5 and 6. Fig. 12 is an edge elevation of the companion hinge member to Figs. 7 and 8. Fig. 13 is a side elevation of the companion hinge member to Figs. 7 and 8. Fig. 14 is a side elevation of a brace rod which is hinged at its upper end between the ears at the upper end of Fig. 12. Fig. 15, is an edge elevation of Fig. 14. Fig. 16 is a plan of an eye bolt used upon the side wings. Fig. 17 is a plan of a slotted eye bolt which is used upon the high end boards. Figs. 1 and 2 are upon a smaller scale than the others.

Similar numerals and letters indicate like parts in the several views.

The wagon box like the usual box upon farm wagons is formed of a plurality of cross sills 1 and 2, the former being placed near the ends of the box and being substantially as long as the width of the box and the latter being spaced from the end sills and extending outward a distance from each side of the box, the box being of a width for fitting between the usual stakes in the forward and rear bolsters of the axles. Additional cross sills 3, may be secured in position for fitting between said bolsters as is usual. A bottom 4, is secured to the cross sills and side boards 5, erected at each side of the box, of such dimensions as the use of the box requires.

Bolted to each side board with bolts $5^a$, and their threaded ends passed through the bottom 4 and end cross sills and secured thereto with nuts 6, are hinge members 7, (see Figs. 5 and 6). Bolted to each side board with bolts 8, and their threaded ends passed through the bottom 4 and intermediate cross sills 2, and secured thereto with nuts 9, are hinge members 10, (see Figs. 7 and 8). The members 10, are also secured to the cross sills 2, with bolts 11. An end board *a*, of the usual type slipped down between two battens *b*, each side of the box at the forward end thereof, as is shown in Figs. 3 and 9, one batten each side of the box only being shown, is provided, and a rear end board 12, hinged with hinges c, to the rear end of the wagon and its ends fitted to shut into rabbets d, formed in the rear ends of the side boards is arranged to swing downward, as is shown in dotted lines in Fig. 4, and in heavy lines in Fig. 10, with an addition to it for holding stock, as will be further explained. Said end boards being in position, the wagon box as thus far explained, is adapted for all the uses of the usual wagon box upon a farm, and the hinge members, while strengthening the box, in no way interfere with its use. The side wings 13, each consists of a plurality of boards 14, the length of the wagon box, secured to cross pieces 15, one cross piece to each hinge member, 7 and 10, upon each side of the box. The two cross pieces at the ends of the wings have secured to them with bolts or screws, as 16, hinge members 17, which are fitted to be connected with the members 7, through the eye 19.

The two intermediate cross pieces have secured to them with bolts 16, hinge members 18, which are adapted to be connected with the members 10, through the eye 19. The hinge member 17, is simply a plain piece of flat bar iron having an eye 19, through which a pintle 20, can pass and through the eye 21, in the ears 22, of the member 7, and connect the members 7 and 17, together. The hinge members 18, are like pieces of iron having an eye 19, at one end for connection with ears 22, upon the member 10, and at their upper ends an eye 23, to which brace rods 24, are hinged, said brace rods being adapted in length to pass through the aperture 25, in the hinge members 10, and abut against the angular part 26, of the members 10, for supporting the side wings 13, in a nearly horizontal position, and also, hold the wings vertical by its lower ends 27, resting upon the top of the part 10, just outside of the ears 22 where a horizontally arranged seat is formed for receiving the lower end of said brace rod. A spring button 28, is pivoted to the hinge member 18, and arranged to swing across the bar and hold it in position when it is desired to hold the side wing vertical and thereby prevent any jarring of the wagon from permitting the side wing to fall from its vertical position. It will be observed that hinge members having a brace rod are only on the intermediate hinges, the end ones not requiring them for the reason that each end of the side wings is provided with a tie rod 29, which is connected to the wing by means of an eye bolt 30, of sufficient capacity for receiving the eye 31, of its own tie rod and the hook 32, of the tie rod upon the opposite side wing, when said wings are in a vertical position, but when said wings are in a horizontal position, said tie rods are connected with slotted eye bolts 33, upon the end board extensions 34, the end board 34, being upward extension of end board a or 12, attached to vertical strips 35, to which boards 36 are nailed, said strips being slipped into sockets 37, which are shown as being secured to the end board 12, in Fig. 4. With side wings arranged vertically, as in Fig. 2, the rack is adapted for carrying small live stock, but for larger stock higher inclosing walls are required and the basket sides 38, are provided. These consist of pieces 39, corresponding in number and spacing apart, with the cross pieces 15, of the side wings, and of a length exceeding by a few inches, one half the width of the wagon box. Boards 40, are secured to said cross pieces with nails or otherwise. The upper end of each cross piece 15, is provided with a loop 41, formed of suitable band iron and pivoted at 42, to a cross piece 15, at such a point thereon as will allow the loops to receive an end of a cross piece 39, parallel with the cross pieces 15, as in Fig. 10, or at right angles with them as in Figs. 3 and 4. In the former position, they provide additional height for adapting the rack for carrying live stock as is shown in Fig. 10. When the loops are not in use, as in Fig. 9, they will hang downward. In the position at right angles with the cross pieces 15, as in Fig. 3, they provide additional retaining means for fine hay, bundles of grain, &c., and when the side wings are vertical, as in Fig. 4, they form with the side wings and end board extensions 34, an inclosure for carrying fowls.

It may be noted that an extra pair of end boards corresponding with the height of the side wings and basket sides, as in Fig. 10, should be provided for carrying large live stock, as is shown by the representation in dotted lines in Fig. 10, of the upper portion of the end board. The usual ladder 43, may be supported in any suitable manner at the forward end of the wagon.

The end board 12, is provided with a groove 44, under the strap hinges c, which is adapted to receive the rod 45, said rod having a thumb nut head 46, at one end, is threaded at the other and provided with a long nut 47, the rod being adapted for being run along the groove under the straps of the hinges for holding the end board closed. The rear end board being hinged to the wagon from its lower edge, it can be swung down and used as a shoveling board in unloading, or when the end board extension 34, is attached to it, it can be swung downward and used as a gang plank in loading stock, it being held at any desired angle by means of chain links 48, temporarily connected therewith, into which the hooks 32 of the tie rods 29, can be hooked. The basket sides 38, are provided at each end with eye bolts 50, with which rods 49, are hinged and connect with staples 51, upon the highest end board extension and when the basket sides are arranged vertically, as in Fig. 10, the extended end boards can be provided with staples with which the tie rods of the basket sides can be connected. In Fig. 2, the pintle of the hinges of the side wings, on account of its small scale, is represented as a straight pin provided with a head. In practice this style of pintle is not used, it being unsafe, and I have devised a pintle with a portion of its length pivoted to the main portion. This is shown in the pintle 20ª, in the eyes of the hinge member 7, in Fig. 6.

A hinged part e, is pivoted at f, to the main part of the pin, one end of the part e, being heavier than the other it will assume a vertical position by reason of said heavy end after its insertion, and no amount of jarring of the wagon can displace it, the pintle having a head g, at one end and the hinged part e, at the other both naturally hanging downward so that its removal without manual operation is impossible.

The tie rods 29, are each provided with a flattened space 52, which will admit the rod, when the wings are vertical, to the swiveled eye bolt below it, through the slot h, of the eye, and permit the tie rod to slide through the eye and allow the side wings to be swung down to the hay rack position, while the rods cannot be jarred out of the eye bolts in passing over rough ground and allow the side wings to fall below their horizontal position.

Having described my invention, what I claim and desire to secure by Letters Patent, is,—

In a wagon rack having the usual side boards, cross sills and side wings hinged to the side boards, a hinge for connecting the side wing to a side board, consisting of a lower and upper member pivotally connected, each formed of a flat bar of metal, the lower member secured to the inner side of a side board and having a right-angled bend outward at the top of said side board, ears between which the upper member is pivotally mounted, a horizontally arranged extension of the part between said ears, an abutment below said extension in the same vertical plane therewith, with its outer face at an angle with the side boards, an upper hinge member secured to the side wings transversely thereof, a brace bar consisting of a straight bar of metal hinged to the upper member near the top thereof, a square or flat lower end thereto adapted to fit closely upon said horizontally arranged extension of the lower member at the instant when the two hinge members are swung into a parallel position relative to each other, and against said abutment when the hinge members are at a nearly right angle with each other, and means for holding the brace bar against the upper hinge member when it is in parallel relation with its companion hinge member.

LOUIS BOLDIG.

Witnesses:
ALOYS RIENDL,
ED BEEDLE.

---

Copies of this patent may be obtained for five cents each, by addressing the "Commissioner of Patents, Washington, D. C."